(12) United States Patent
Pavuk

(10) Patent No.: US 7,625,001 B2
(45) Date of Patent: Dec. 1, 2009

(54) SINGLE AND TANDEM SHUNTED TORSION BAR SUSPENSIONS

(75) Inventor: Gregory D. Pavuk, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 511 days.

(21) Appl. No.: 11/432,994

(22) Filed: May 12, 2006

(65) Prior Publication Data

US 2007/0262550 A1 Nov. 15, 2007

(51) Int. Cl.
 *B60G 11/18* (2006.01)
(52) U.S. Cl. ............... 280/124.166; 267/273; 267/277; 267/285; 280/5.508; 280/5.509; 280/124.167
(58) Field of Classification Search .......... 280/124.167, 280/124.166, 124.168, 5.511, 124.169, 5.5, 280/5.508, 5.509; 267/273, 277, 278, 285
See application file for complete search history.

(56) References Cited

U.S. PATENT DOCUMENTS

| 2,083,381 | A | * | 6/1937 | Hutchinson, Jr. ............ 280/104 |
| 2,536,769 | A | * | 1/1951 | Rix et al. .............. 280/124.106 |
| 3,086,793 | A | * | 4/1963 | Kozicki ...................... 280/104 |
| 3,147,990 | A | * | 9/1964 | Wettstein .................... 280/104 |
| 3,149,690 | A | * | 9/1964 | Rosenkrands et al. ....... 180/360 |
| 3,701,542 | A | * | 10/1972 | Grosseau et al. ...... 280/124.152 |
| 3,737,173 | A | * | 6/1973 | Boissier et al. ............. 280/684 |
| 3,831,966 | A | * | 8/1974 | Grosseau ............. 280/124.137 |
| 6,530,586 | B2 | * | 3/2003 | Fader et al. ........... 280/124.106 |

* cited by examiner

*Primary Examiner*—Eric Culbreth
(74) *Attorney, Agent, or Firm*—Carlson, Gaskey & Olds

(57) ABSTRACT

A vehicle suspension utilizes a shunt linkage assembly between first and second torsion springs to change effective lengths of the first and second torsions springs in jounce and roll modes of operation. A first lever arm couples the first torsion spring to a first wheel and a second lever arm couples the second torsion spring to a second wheel component. The shunt linkage assembly acts as a tension-compression link between the opposed first and second lever arms. During jounce the first and second torsion springs would have one effective length, and during roll the first and second torsion springs would have a shorter effective length to provide roll stiffness that is greater than jounce stiffness.

13 Claims, 2 Drawing Sheets

SINGLE AND TANDEM SHUNTED TORSION BAR SUSPENSIONS

TECHNICAL FIELD

A vehicle suspension couples a shunt linkage between first and second torsion springs to change effective spring lengths in jounce and roll modes of operation.

BACKGROUND OF THE INVENTION

Suspensions for commercial vehicles, are often complex and expensive. It is challenging to efficiently package multiple suspension components, such as spring elements and shock absorbers, within a designated packaging space. The spring elements and shock absorbers must be free of other vehicle underbody components that spin and/or articulate during vehicle operation. For example, the spring elements and shock absorbers cannot interfere with the operation of a drive shaft in a drive axle configuration. The spring elements and shock absorbers also cannot interfere with movement of a knuckle assembly in a steering axle configuration, and cannot interfere with movement of an upper control arm in independent suspension applications.

Additional challenges are presented by vehicle applications that have extreme ranges of wheel travel. Further, many systems require suspensions that are ride height adjustable and load level adjustable over a significant range of axle loading. This further complicates systems and increases costs.

Traditional torsion bar independent suspensions use either an upper or lower control arm to twist a length of a tube or rod to act as a torsion spring. Ride height and static load are manually adjusted by a jack-screw mechanism located at a grounded end of the torsion springs at a vehicle chassis. Effective lengths of the torsion springs are fixed. Jounce stiffness is determined by the arm and the rate of the full length of the torsion spring. Roll stiffness is determined by the vertical rate at opposite wheels. If additional roll stiffness is required, an auxiliary sway bar may be incorporated into the suspension system.

Thus, there is a need for a simple and effective suspension system capable of providing desired roll and jounce stiffness as well as being ride height adjustable and load level adjustable.

SUMMARY OF THE INVENTION

A vehicle suspension includes first and second torsion springs. The first and second torsions springs are laterally spaced apart from each other and have one end grounded to a vehicle chassis, and an opposite end coupled to a respective one of first and second lever arms, respectively. Thus, the first lever arm couples the first torsion spring to a first wheel component and the second lever arm couples the second torsion spring to a second wheel component. A shunt linkage is coupled to the first and second torsion springs to provide different effective spring lengths during jounce and roll modes of operation. Jounce stiffness is determined by the lever arm and a spring rate of the associated torsion spring. Roll stiffness is determined by vertical rates at opposite wheels, i.e. laterally spaced wheels.

The shunt linkage reacts between the first and second torsion springs such that during a jounce mode of operation each torsion spring has a first effective length and during a roll mode of operation each torsion spring has a second effective length different from the first effective length. Preferably, the second effective length is shorter than the first effective length. This provides a system with a greater roll stiffness than jounce stiffness.

The shunt linkage acts as a tension-compression link between the first and second lever arms of the first and second torsion springs. During jounce and rebound modes of operation, the shunt linkage is not in tension or compression as the rotation of each torsion spring is equal. During roll, the rotation of the first and second torsion springs are opposite from each other, and the shunt linkage is loaded up such that torque is transferred from one torsion spring to the other torsion spring.

The subject invention provides a simple and effective method and apparatus for providing desired roll and jounce characteristics. These and other features of the present invention can be best understood from the following specification and drawings, the following of which is a brief description.

DETAILED DESCRIPTION OF THE PREFERRED EMBODIMENT

Figure 1:
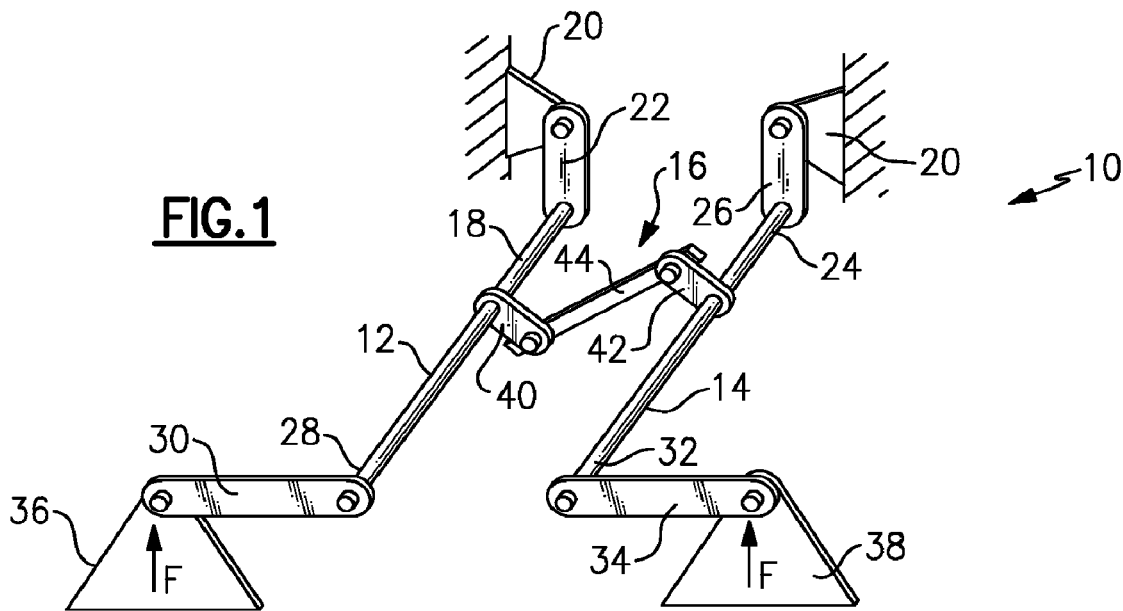
FIG. 1 is a schematic isometric view of a suspension incorporating the subject invention.

FIG. 1 shows a vehicle suspension 10 with a first torsion spring 12, a second torsion spring 14, and a shunt linkage 16 that couples the first 12 and second 14 torsion springs together. The first torsion spring 12 has one end 18 grounded to a vehicle chassis 20 with a first connection member 22. The second torsion spring 14 has one end 24 grounded to the vehicle chassis 20 with a second connection member 26. The first 12 and second 14 torsion springs extend in a longitudinal vehicle direction, i.e. in a direction extending from a vehicle front to a vehicle rear.

An opposite end 28 of the first torsion spring 12 is pivotally connected to a first lever arm 30 and an opposite end 32 of the second torsion spring 14 is pivotally connected to a second lever arm 34. The first lever arm 30 is coupled to a first wheel component 36 and the second lever arm 34 is coupled to a second wheel component 38. The first 36 and second 38 wheel components are laterally spaced apart from each other along a lateral axis. In the example shown, the first wheel component 36 comprises a part that moves with a right side wheel for a front axle and the second wheel component 38 comprises a part that moves with a left side wheel for the front axle. A similar torsion spring configuration (not shown) would couple torsion springs together for the rear wheels on an opposite end of the vehicle suspension 10.

The shunt linkage 16 includes a first link 40 fixed to the first torsion spring 12 and a second link 42 fixed to the second torsion spring 14. A central link 44 is pivotally connected between the first 40 and second 42 links. The shunt linkage 16 cooperates with the first 30 and second 34 lever arms to vary the effective lengths of the first 12 and second 14 torsion springs to achieve desired roll and jounce stiffnesses. The first 40 and second 42 links are preferably located near a central region of the first 12 and second 14 torsion springs, i.e. are longitudinally spaced by a substantial distance from grounded ends of the first 12 and second 14 torsions springs.

The shunt linkage 16 acts as a tension-compression link between opposed lever arms on the first 12 and second 14 torsions springs. During jounce and rebound the shunt linkage 16 is not in tension or compression because the rotation of each of the first 12 and second 14 torsion springs is generally the same. During a roll mode of operation, rotation of the first 12 and second 14 torsion springs is in opposition, and the shunt linkage loads up and transfers torque from one torsion spring to the other torsion spring. In effect, during jounce the torsion springs would have one effective length, and during roll the torsion springs would have a shorter effective length. This results in roll stiffness being greater than jounce stiffness.

Figure 2:
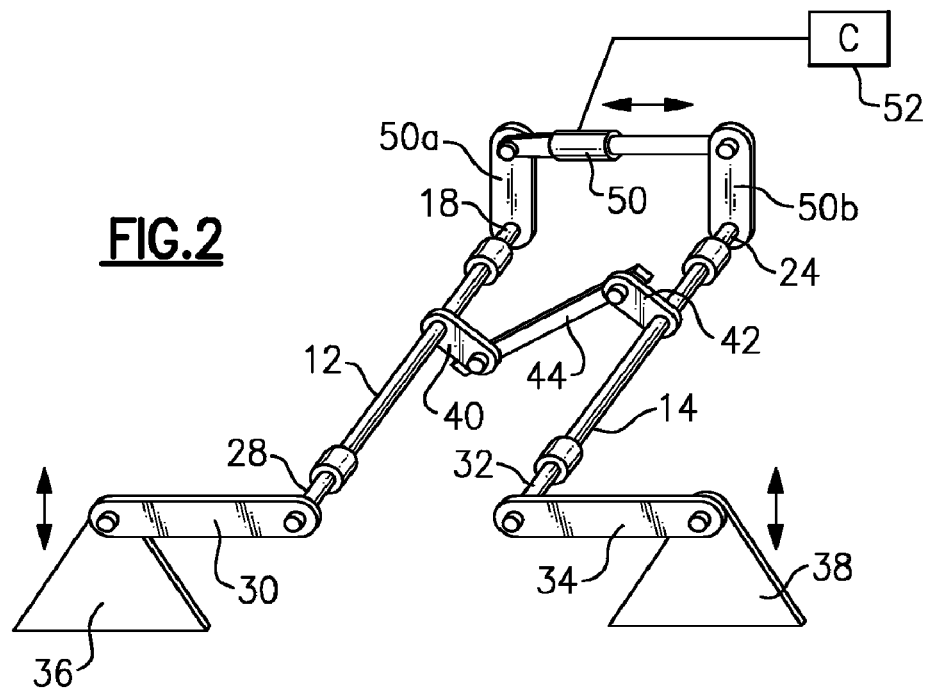
FIG. 2 is the suspension of FIG. 1 with a ride-height adjustment mechanism.

The vehicle suspension 10 could include a ride height adjustment mechanism 50 as shown in FIG. 2. The ride height adjustment mechanism 50 is an actively adjustable length mechanism that is used to change static preload. The ride height adjustment mechanism 50 could be a ball screw or hydraulic cylinder, for example. The ride height adjustment mechanism 50 is controlled by a controller 52 and can be used to change ride height to a desired height, or can be used to actively maintain a desired ride height as loading changes. The ride height adjustment mechanism 50 could extend between the first 12 and second 14 torsions springs as shown at 50a and 50b, or optionally an adjustment mechanism could be incorporated between each spring and the chassis (not shown).

Figure 3:
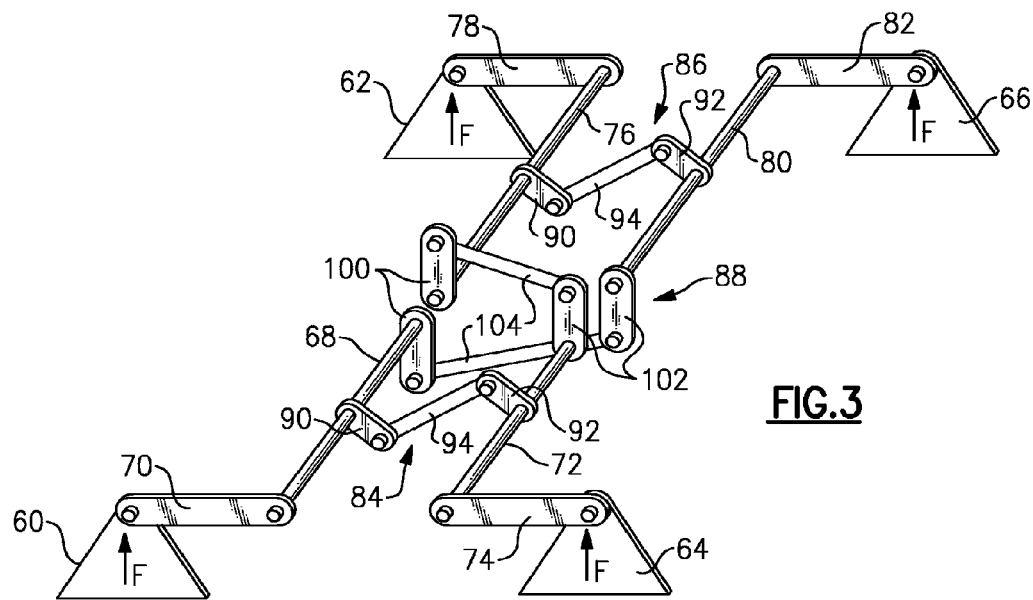
FIG. 3 is a schematic isometric view of another embodiment of a suspension incorporating the subject invention.

The example shown in FIGS. 1 and 2 are especially effective for a four (4) wheeled vehicle. The example shown in FIG. 3 is only effective for a tandem axle configuration. A tandem axle assembly includes a forward-rear axle and a rear-rear axle as known. The forward-rear axle includes first 60 and second 64 wheel components, and the rear-rear axle includes third 62 and fourth 66 wheel components.

A first torsion spring 68 is pivotally connected to a first lever arm 70, which is coupled to the first wheel component 60. A second torsion spring 72 is pivotally connected to a second lever arm 74, which is connected to the second wheel component 64 on a forward axle. On an opposite axle, a third torsion spring 76 is pivotally connected to a third lever arm 78, which is connected to the third wheel component 62. A fourth torsion spring 80 is pivotally connected to a fourth lever arm 82, which is connected to the fourth wheel component 66.

A first shunt linkage 84 couples the first 68 and second 72 torsion springs together. A second shunt linkage 86 couples the third 76 and fourth 80 torsion springs together. A fixed or adjustable length mechanism 88 is used to interconnect the first 68 and fourth 80 torsion springs and the second 72 and third 76 torsion springs.

Each of the first 84 and second 86 shunt linkages includes a first link 90 fixed to a respective one of the first 68 and third 76 torsion springs, a second link 92 fixed to a respective one of the second 72 and fourth 80 torsion springs, and a central link 94 pivotally connecting the first 90 and second 92 links. Each fixed or adjustable length mechanism 88 includes a first link 100 fixed to a respective one of the first 68 and third 76 torsion springs, a second link 102 fixed to a respective one of the second 72 and fourth 80 torsion springs, and a central link 104 interconnecting the first 100 and second 102 links. The central link 104 comprises a fixed length link or an adjustable length link that can be adjusted for ride height and load purposes as described above.

The embodiment shown in FIG. 3 operates in a manner similar to that of FIGS. 1 and 2 in that roll stiffness can be increased without adversely affecting jounce stiffness. The first 84 and second 86 shunt linkages cooperate with the first 70, second 74, third 78, and fourth 82 lever arms to change the effective length of the first 68, second 72, third 76, and fourth 80 torsion springs in a manner similar to that described above.

The tandem system would have a soft pitch, a normal heave, and would be stiff in roll due to the shunt linkages. This configuration would also be relatively soft in warp mode to allow for low single wheel lift rates, such as when a single wheel goes over a curb.

Figure 4:
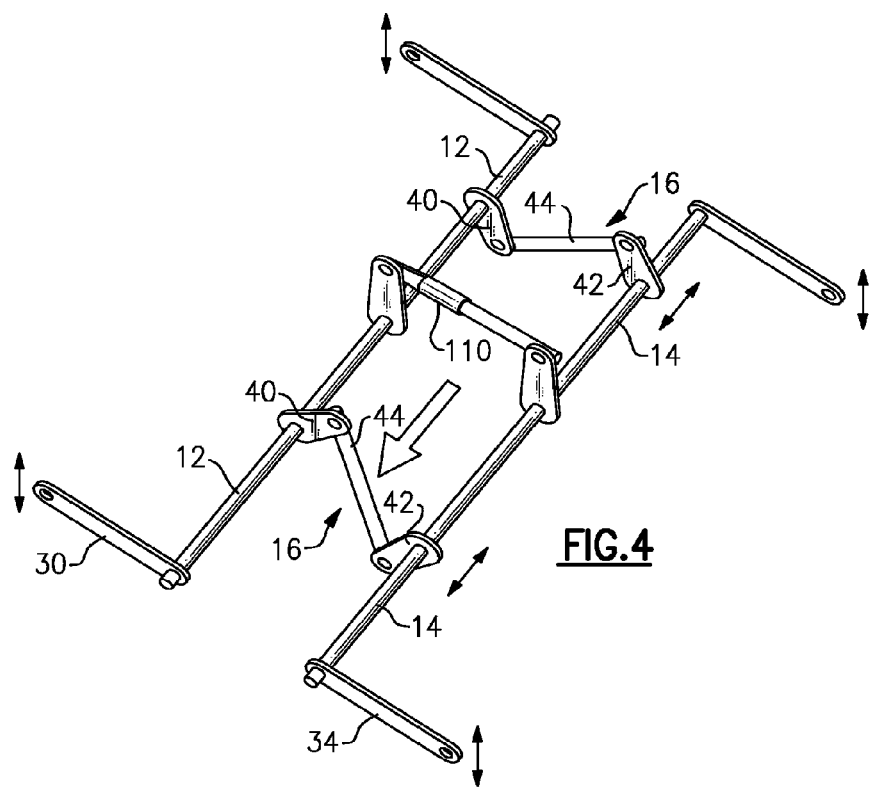
FIG. 4 is a schematic isometric view of another embodiment of a suspension incorporating the subject invention.

FIG. 4 is an isometric view of a four-wheel embodiment similar to that of FIGS. 1 and 2, except that FIG. 4 shows all four (4) wheel components instead of showing just two wheel components. A shunt linkage 16 is coupled to first 12 and second 14 torsion springs at each end of the vehicle. In this embodiment a fixed or adjustable length mechanism 110 is used to connect first 12 and second 14 torsion springs on opposite sides of the vehicle.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle suspension comprising:
   a first torsion spring adapted to interconnect a vehicle chassis to a first wheel component;
   a second torsion spring adapted to interconnect the vehicle chassis to a second wheel component; and
   a shunt linkage assembly permanently interconnecting said first and said second torsion springs such that during a jounce mode of operation each torsion spring has a first effective length and during a roll mode of operation each torsion spring has a second effective length different from the first effective length, and wherein the second effective length is shorter than the first effective length such that roll stiffness is greater than jounce stiffness.

2. The vehicle suspension according to claim 1 wherein said first torsion spring includes a first spring end coupled to the vehicle chassis and a second spring end coupled to a first lever arm that is coupled to the first wheel component; and wherein said second torsion spring includes a third spring end coupled to the vehicle chassis and a fourth spring end coupled to a second lever arm that is coupled to the second wheel component.

3. The vehicle suspension according to claim 1 wherein the first wheel component comprises a right side wheel component and the second wheel component comprises a left side wheel component laterally spaced from the right side wheel component.

4. The vehicle suspension according to claim 1 wherein said first and said second torsion springs extend in a longitudinal vehicle direction.

5. The vehicle suspension according to claim 1 wherein said shunt linkage assembly includes a first link fixed to said first torsion spring, a second link fixed to said second torsion spring, and a single-piece central link having one end pivotally connected to said first link and an opposite end pivotally connected to said second link.

6. A vehicle suspension comprising:
   a first torsion spring adapted to interconnect a vehicle chassis to a first wheel component wherein said first torsion spring includes a first spring end coupled to the vehicle chassis and a second spring end coupled to a first lever arm that is coupled to the first wheel component;
   a second torsion spring adapted to interconnect the vehicle chassis to a second wheel component wherein said second torsion spring includes a third spring end coupled to the vehicle chassis and a fourth spring end coupled to a second lever arm that is coupled to the second wheel component;

a shunt linkage assembly interconnecting said first and said second torsion springs such that during a jounce mode of operation each torsion spring has a first effective length and during a roll mode of operation each torsion spring has a second effective length different from the first effective length, and wherein said shunt linkage assembly includes at least a first link coupled to said first torsion spring at a distance spaced from said first spring end, a second link coupled to said second torsion spring at a distance spaced from said third spring end, and a central link pivotally coupling said first link to said second link; and wherein a first coupling interface between said first link and said first torsion spring is generally centrally located between said first and said second spring end, and wherein a second coupling interface between said second link and said second torsion spring is generally centrally located between said third and fourth spring ends.

7. A vehicle suspension comprising:

a first torsion spring adapted to interconnect a vehicle chassis to a first wheel component;

a second torsion spring adapted to interconnect the vehicle chassis to a second wheel component;

a shunt linkage assembly interconnecting said first and said second torsion springs such that during a jounce mode of operation each torsion spring has a first effective length and during a roll mode of operation each torsion spring has a second effective length shorter than the first effective length; and an adjustable length member that is adjustable to change relative static orientation between said first and said second torsion springs.

8. A method of assembling a vehicle suspension comprising the steps of (a) coupling a first torsion spring to a vehicle chassis and a first wheel component;

(b) coupling a second torsion spring to the vehicle chassis and a second wheel component; and (c) permanently coupling the first and second torsion springs to each other with a shunt linkage assembly such that during a jounce mode of operation each torsion spring has a first effective length and during a roll mode of operation each torsion spring has a second effective length that is shorter than the first effective length such that roll stiffness is greater than jounce stiffness.

9. The method according to claim 8 including the step of coupling the shunt linkage assembly at a generally central location on the first and second torsion springs.

10. The method according to claim 8 including the steps of coupling a first lever arm to the first torsion spring, coupling a second lever arm to the second torsion spring, coupling the first lever arm to the first wheel component, and coupling the second lever arm to the second wheel component.

11. The method according to claim 8 wherein the first and the second wheel components are laterally spaced apart from each other along a lateral axis and wherein the first and the second torsion springs extend in a longitudinal direction transverse to the lateral axis.

12. The method according to claim 8 wherein the shunt linkage assembly includes a first link, a second link, and a single-piece central link, and including fixing the first link fixed to the first torsion spring, fixing the second link fixed to the second torsion spring, and pivotally connecting one end of the single-piece central link to the first link and pivotally connecting an opposite end of the single-piece central link to the second link.

13. A method of assembling a vehicle suspension comprising the steps of (a) coupling a first torsion spring to a vehicle chassis and a first wheel component;

(b) coupling a second torsion spring to a vehicle chassis and a second wheel component;

(c) coupling the first and second torsion springs to each other with a shunt linkage assembly such that during a jounce mode of operation each torsion spring has a first effective length and during a roll mode of operation each torsion spring has a second effective length shorter than the first effective length; and (d) adjusting relative static orientation between the first and the second torsion springs with an adjustable length member.

* * * * *

UNITED STATES PATENT AND TRADEMARK OFFICE
CERTIFICATE OF CORRECTION

PATENT NO. : 7,625,001 B2  Page 1 of 1
APPLICATION NO. : 11/432994
DATED : December 1, 2009
INVENTOR(S) : Gregory D. Pavuk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this

Twenty-first Day of December, 2010

David J. Kappos
*Director of the United States Patent and Trademark Office*